UNITED STATES PATENT OFFICE.

JOHN H. STEVENS, OF NEWARK, NEW JERSEY, ASSIGNOR TO THE CELLULOID COMPANY, OF NEW YORK, N. Y., A CORPORATION OF NEW JERSEY.

TRANSPARENT PYROXYLIN PLASTIC COMPOSITION.

SPECIFICATION forming part of Letters Patent No. 622,293, dated April 4, 1899.

Application filed January 5, 1899. Serial No. 701,239. (No specimens.)

*To all whom it may concern:*

Be it known that I, JOHN H. STEVENS, of the city of Newark, county of Essex, and State of New Jersey, have invented certain new and useful Improvements in Transparent Pyroxylin Plastic Compositions, of which improvements the following is a specification.

Pyroxylin or nitrocellulose is formed by subjecting cotton, paper, or other cellulose fiber to the action of a mixture of nitric and sulfuric acids. It is a substance which represents many varieties or kinds, dependent on the degree of activity or other peculiarities of the reaction between the cellulose and nitrous elements of the acid-bath. The classification of pyroxylin has been based on the amount of nitrogen or nitrous elements present, especially for explosives, but also and chiefly on the solubility of the different kinds in various menstrua, because pyroxylin containing the same percentage of nitrogen often varies in solubility. The former classification is useful for many purposes, but chiefly in connection with certain solid nitrocellulose products used in gunnery, because the intensity of discharge depends largely on the amount of nitrogen gas liberated on explosion, regardless of solubility; but for manufacturing purposes the solubility and strength of the pyroxylin are all important and the physical classification is kept in view.

Pyroxylin is compounded with solvents and other substances to form a great variety of products. These products present wide differences, dependent on their nature and application; but they can be divided into, first, explosives for blasting and gunnery; second, collodions or flowable solutions, and, third, solids such as are used in imitation of natural substances. Each of these classes contains subclasses. For instance, class three is further subdivided into transparents and non-transparents. While all of these products are made from pyroxylin and often with somewhat similar ingredients, they must necessarily possess certain definite properties which will fit them for specific applications. Consequently a pyroxylin compound is not distinguished by the names of its ingredients, but by their character, proportions, and structural association. Thus pyroxylin and nitroglycerin will form a mass resembling wet sawdust, a syrupy fluid, or a homogeneous rubber-like mass by simply varying the kinds of pyroxylin, some pyroxylin being insoluble in nitroglycerin, some easily soluble, and some simply swelling up to a jelly in its presence. Similarly in making compositions for rolling a mixture of camphor, alcohol, and pyroxylin will make a pulverulent mass, an opaque solid, or a transparent compound by simply varying the quality or quantity of the ingredients.

The compositions which form the subject of the present invention belong to the subclass of transparent moldable pyroxylin compounds, and they are intended principally for use in the arts as imitations of amber, glass, and tortoise-shell. I have found by a long experience that the essential characteristics for such imitations are solidity, transparency, plasticity under heat, or capability of being pressed into different shapes in hot dies or otherwise when in a hard condition, and permancy or resistance to the action of time or elevated temperatures.

While the different ingredients from which I form my compositions are well known and some of them have been suggested to be used in connection with a certain kind of pyroxylin known as "tetranitrocellulose," they have not, so far as I am aware, been brought into the peculiar new relations which I have demonstrated form a composition possessing entirely new properties of great value in this art. The property of permanency in these transparent compounds is of extraordinary importance, because it is closely associated with the danger of destructive fires and deterioration of valuable goods.

Pyroxylin and its compounds are more or less liable to a decomposition, which results in the generation of free acid. This generally occurs when these products are stored or kept for any length of time, especially in large masses, where the heat of decomposition might accumulate through lack of surface exposure. The presence of solvents or the dissolved condition hinders this tendency to disorganization; but if even the most carefully made products contain no preservative substance there is always danger of the evolution of acid, the effects of which are disadvantageous and often hazardous.

There are plenty of known means for securing stability in non-transparents or even in clouded transparents; but the arts demand a high transparency in order to successfully imitate amber and glass effects, and it has been extremely difficult to secure high transparency and stability at the same time. Hence any composition of matter which gives the desired properties has to depend on proportions, the properties of the substances, and their behavior under special conditions of manufacture, such as their reaction or compatibility with other necessary ingredients of the transparent compounds. For these reasons many antacids have been tried and thrown aside, and those which the art now possesses have been selected from a larger number which might have been expected to yield good results, but which failed because they did not meet the requirements. Some substances while efficient as neutralizers of acid would in turn injure the nitrocellulose by aiding or inviting decomposition. Some cause discoloration, and most of them are incompatible with transparency. Urea and urea acetate, for instance, when in contact with pyroxylin yield nitro-products which attack metals and cause an exudation or efflorescence which is detrimental, especially on polished surfaces of pyroxylin compounds. The corrosive nature of these by-products renders extraordinary care necessary when using fine metal dies or plates. Urea and urea acetate are also more or less subject to discoloration, especially under severe conditions of treatment where heat is applied to the products or when they are exposed to strong light.

It frequently happens, as I have already pointed out in my United States Patent No. 519,987, that the mere employment of a substance in connection with pyroxylin for one purpose does not necessarily disclose its usefulness for other purposes or the peculiar properties which it may give the compound under other conditions of treatment, its use in other proportions, or in different combinations. This is illustrated in the history of the art, and it is because of the many applications of these compounds and the peculiar properties demanded for their many uses that inventors have given them so much attention. Many hundreds of patents have been issued both in this country and abroad for various processes, mixtures, and applications. First, the pyroxylin itself has been made by numerous methods and subjected to various treatments; second, the compounds have been made by many special processes; third, liquid solvents in great variety have been discovered and applied; fourth, solid solvents or solvents which when melted by heat or dissolved in a liquid act on the pyroxylin have been discovered and used; fifth, various non-solvent substances have been employed to modify the character of the compounds and render them susceptible of special application; sixth, the art has been advanced by special combinations or the association of old ingredients with new processes; seventh, the applicability of special compounds to particular uses has formed the basis for numerous inventions, and, eighth, certain compounds have depended for their properties not only on special ingredients, but also on the particular kind of pyroxylin used.

The present invention is based on the discovery of new properties in certain solid and liquid bodies which are neither alone nor in solution solvents of the pyroxylin generally employed for manufacturing transparent compounds. It includes their action with other ingredients and the necessary proportions to be used to effect useful results, and its place in this field is best understood by referring to the history of a somewhat similar line of invention. Thus by some inventors certain inorganic salts have been proposed to be used to render pyroxylin compounds non-inflammable. Examples of such salts, for instance, are chlorid of calcium, chlorid of zinc, &c.; but in order to effect such result they must necessarily be used in large proportions to the amount of pyroxylin present. So, also, some other salts—such as oxalate of ammonium, chlorate of potash, and nitrate of soda—have been added by some inventors to the explosive varieties of nitrocellulose in order to modify or increase the explosive power. Still, again, certain salts have been proposed to be used when added to non-solvents of pyroxylin, like ethyl alcohol, in order to make the mixture a solvent of a certain kind of pyroxylin known as "tetranitrocellulose;" but none of these uses is in any way analogous to my invention, which relates solely to the discovery that certain salts when added to transparent pyroxylin compounds in certain proportions have the effect of neutralizing the nitrous acid developed in such compounds, and thereby tend to preserve these compounds from deterioration. At the same time they do not interfere with the transparency of the compound, which is so desirable for many purposes. That the discovery of the utility of the salts mentioned in this application for this purpose is foreign to the various inventions of prior inventors recited above is shown by the fact that many of the inorganic salts and equivalent substances mentioned by them as useful for the several purposes above referred to are wholly unsuited to the purpose of my invention.

It is the object of the present invention to give stability to transparant pyroxylin compositions of matter by combining with the pyroxylin or its mixture with solvents a certain class of new preserving agents which I have found by experiment possess extraordinary power and efficiency.

The class of substances to which I refer are the inorganic salts of lactic acid. By "lactic acid" I mean the ordinary commercial lactic acid, which generally consists of varying proportions of alpha and beta lactic acid and small quantities of other compounds. These salts of lactic acid are easily made by simply combining the commercial lactic acid with the different inorganic bases. By the "salts of lactic acid" I mean any commercially-available salt formed by chemically uniting lactic acid with an inorganic base or bases. By reason of its peculiar chemical nature ammonium is included among the inorganic bases, although it is sometimes called an "organic" substance. While my experiments disclose that all these salts of lactic acid possess more or less preserving power when they are combined with pyroxylin or its products, I have ascertained that some of them are superior to others. I have used with great success the lactates of potassium, lead, strontium, lithium, calcium, sodium, and barium. Any of these seven lactates just mentioned when combined with transparent pyroxylin products in proper proportions will give a stability equal or superior to that imparted by urea or urea acetate. They give no harmful by-products and under severe treatment and exposure to light are apparently not subject to the discoloration which is so objectionable in the urea compounds.

As operators skilled in the art have a knowledge of chemistry and the properties of the substances employed in their mixtures or else are advised by skilled chemists, it is unnecessary for me to point out the properties of the different salts of lactic acid or the need of having them neutral and as colorless as possible for the best effects. Of course there is a large number of these salts besides those which I have specifically mentioned. They also vary in their properties according to the bases with which the lactic acid is united, and the presence of some of them is objectionable in some pyroxylin compounds because of the peculiar properties imparted by the bases. For instance, it is known that the salts of iron are liable to discoloration. Thus lactate of iron has a greenish color and turns brown on exposure to the air and light. Lactate of copper is greenish blue in color. It is evident, therefore, that while for certain transparent compounds any of the salts of lactic acid may be more or less useful the requirements of the art cause some of them to be preferred above others in special instances. The operator must also keep in mind the fact that the inorganic salts of lactic acid are not only non-solvents of the pyroxylin commonly employed to make transparent moldable compounds, but they weaken the solvent action of the alcohols in direct proportion to their presence.

In applying my invention I mix the soluble pyroxylin commonly employed for transparent compounds with a liquid solvent and sufficient camphor to give the final product molding properties. The liquid solvent is preferably wood-spirit and is used in sufficient proportion to produce a mass which can be masticated in the rollers or other mixing machinery, although I do not confine myself to any particular proportion so long as the final result is a solid transparent compound. I introduce the antacid salt either dissolved in alcohol or wood-spirit or together with any other of the ingredients in which it is soluble, or it can be introduced in the dry or pure state and thoroughly incorporated into the compounds by the masticating operations. For these stiffer compounds the lactate of sodium is convenient, as it can be easily dissolved in the alcohol or wood-spirit. The well-known menstruum, acetate of methyl, can be used in place of wood-spirit, if desired, or, in fact, any good solvent which will dissolve the antacid salt or otherwise permit it to become incorporated with the pyroxylin. The lithium lactate is moderately soluble, and the potassium lactate is easily soluble in wood-spirit and alcoholic solvents, and I have obtained excellent effects by their use. The strontium and calcium lactates are practically insoluble in ninety-five per cent. ethyl alcohol. The barium lactate is sparingly if at all soluble. Therefore in using these three salts, especially with alcohol, I often have to depend on the masticating operations for a thorough incorporation. The result, however, is an excellent combination, and it is possible to form compounds of high transparency when these salts are used, thus exhibiting one of the most remarkable results of my experiments.

A good proportion when using the lactates of potassium, strontium, calcium, sodium, and barium is one per cent. to the weight of pyroxylin present in the compound. More or less can be used; but the operator must bear in mind that a less amount should be employed only for compounds which are not to be subjected to severe treatment like strong heating. As to larger proportions, they will tend to cloud or weaken the compounds unless employed in moderation. Two per cent. of the strontium, calcium, and barium lactates can be used without interfering with good transparency and with beneficial results otherwise. With the potassium, lithium, and sodium lactates two per cent. can be used; but the transparency is slightly diminished in thick masses of the material, especially when the lithium salt is used. For thin sheets two per cent. of the sodium and potassium salts gives very fair results. While I have successfully used even as high as five per cent. of certain of these salts which are insoluble in ninety-five per cent. ethyl alcohol, I would not advise the use of more than two per cent. of any of them as an average high proportion, because it is unnecessary unless special effects are desired. While alcohol can be used with all of them successfully, wood-spirit does away with the necessity for the most thorough masticating operations when combining the insoluble lactates. Thorough hot mixing, however, is recommended in all cases.

The art of manufacturing transparent pyroxylin compositions is well known, as is also the difficulty which the operators have experienced in making these compositions so that they would be unchangeable by time or the influence of elevated temperatures, such as are used in molding.

I confine myself to the proportions and ingredients necessary to produce solid transparent compositions, and state that as an example good proportions are, by weight, one hundred parts of ordinary soluble pyroxylin, forty to fifty parts of camphor, fifty to seventy-five parts of wood-spirit, and one part of sodium lactate. I have discovered that though camphor does not unite with these salts in simple admixture it is entirely compatible with them and pyroxylin when used as described and forms a homogeneous compound. There is no separation nor consequent cloudiness, which would be fatal to the effects desired.

I have found the lactate of lead very useful, especially in compounds with which it can be incorporated by masticating operations. I have made transparent sheets containing lactate of lead and found them to be stable, notwithstanding the apparent lack of solubility of this salt in alcohol. From one to two per cent. of the lead salt gives good stability in the products, one per cent. having the best transparency. It is equal to urea in preserving power and remains paler under severe treatment. In using the lead salt I would caution the operator to keep in mind the known tendency of lead salts to discolor in light or in foul air; but I have exposed transparent sheets containing lactate of lead to sunlight and indoor air, and after several months of such exposure I have observed no preceptible darkening or change of color beyond what might have occurred in any ordinary pyroxylin compound. In fact, when tested alongside of urea materials the lactate-of-lead compound remained palest under these conditions.

Among lactate salts other than those which I have mentioned above are lactate of zinc, lactate of magnesium, and lactate of ammonium. In regard to these and the other salts of lactic acid not specifically named herein I recommend their use simply for compounds or mixtures in which their antacid power would be desirable regardless of discoloration or lack of high transparency. I have obtained the best results when using from one to two per cent. of these salts to the pyroxylin and when the products were confined to thin sheets.

Except in a few cases hereinafter stated I confine myself to using no more than five per cent. of the lactate salts, by weight, to the amount of pyroxylin. More than this would make a compound unsuited for my purposes, as it would either lack the requisite transparency or possess other undesirable properties. For instance, when these proportions are exceeded the products lose transparancy and in some cases, as with the lead, lithium, magnesium, and ammonium salts, present a very clouded appearance. When molded or otherwise heated, the ammonium-lactate compound turns brown and corrodes metal. The material containing potassium lactate bubbles and shows other evidence of decomposition, and the products made with sodium lactate, lead lactate, and many of the other salts become more or less discolored. On the contrary, calcium lactate can be used in proportions greater than five per cent. I have used as high as nine per cent., by weight, to the pyroxylin and with good results as to transparency, color, and molding properties. Likewise with five per cent. of the barium salt the compound still possesses a fair transparency and color. Strontium lactate resembles the barium and calcium salts in retaining transparency better than the sodium and potassium salts. It is still highly transparent at five per cent. and of a fairly-good color.

In softening "scrap" material to be "run over" I find considerable difficulty in getting a uniform impregnation if the antacid salt dissolved in the liquid solvent used to "soak" a batch is used in excess of the best proportions recommended. This is because the weakening action of the antacid salts on the alcohol, wood-spirit, or other solvent is plainly preceptible when excessive proportions are employed.

While my experiments have proved that all of the salts of lactic acid are preservers of pyroxylin, I have no explanation to offer for this peculiar action in salts in which the bases have already been saturated with an acid. I can only state the simple fact that they possess this power. As possibly throwing light on the question I can state that, other things being equal, the nature of the acid radical present in the salt determines its preserving power, although this in a certain sense, as already indicated, is complicated with the fact that the different bases in forming antacid salts exhibit variations in their influence on the compatibility of the salt with the other ingredients used in pyroxylin compounds. While lactate of potassium preserves pyroxylin against decomposition, the hyposulfite and the phosphate of potassium possess little or no preserving power. Sheets of pyroxylin compounds containing them stain metal-polishing plates and easily turn acid. My experiments also show that in the case of salts of acids containing two or more dissimilar acid radicals the preserving power depends on the nature of the acid. Thus a salt containing a radical of lactic acid would have some preserving power even though the other acid radicle present possesses no power to form antacid salts. Similarly the salts containing two or more bases—for instance, sodium-calcium lactate—are good preservers according to the properties of their constituents. Hence this invention includes the present series of salts of lactic acid in transparent pyroxylin compositions of matter, whether the salts are simple, compound, mixed, or combined chemically with other salts, except as hereinafter stated.

Perfect solubility of the salt or compound in the solvent employed and the ability to form highly-transparent effects do not give the salt or compound useful antacid power, for I have found that chlorid of calcium dissolves in wood-spirit, while it is of no use for antacid purposes in my compounds, for in the course of my experiments I ascertained that seasoned sheets containing pyroxylin, camphor, and a trace of alcohol along with such small proportions as one and two per cent. of calcium chlorid stained metal and became clouded when I attempted to polish them by pressure between heated plates. In fact, hygroscopic substances, as some of the chlorids—for instance, chlorid of calcium—while they may be capable, in connection with alcohol and a certain kind of pyroxylin, of making a pyroxylin compound useful for artificial silk, filaments for lamps, and a certain class of varnishes are totally incapable of forming a useful imitation of amber, tortoise-shell, or glass having the requisite surface effects. I have long known by experience that compounds made with such deliquescent chlorids attract moisture and become wet on the surface, which property would prevent the sale of such articles as tortoise-shell combs, amber pipe-bits, or transparent sheets for decorative purposes, for all of which my invention is specially applicable.

While the solution of a chlorid salt on the surface can be washed away to some extent, it is always liable to exude from the body of the material and form fresh deposits. Such materials are either incapable of polish or will not retain their polish by reason of this exudation.

I am aware that the inorganic salts of lactic acid soluble in ninety-five per cent. ethyl alcohol—i. e., at least sufficiently soluble to make an alcoholic solution containing about five per cent. of the salt—have been proposed as solvents of tetranitrocellulose in connection with alcohol and methylated spirits as substitutes for camphor-spirits and other well-known solvents and have been described as equivalents for calcium chlorid, zinc chlorid, known solvent esters, and acetic, oxalic, lactic, and hydrochloric acids and other substances totally unfit for my purpose. Most of the salts of lactic acid are so insoluble in alcohol that they cannot be included among those thus proposed for solvent purposes. Hence this classification of solvent usefulness by limits of solubility in alcohol excludes some of my most valuable antacids—for instance, the lactates of barium, lithium, lead, calcium, and strontium, as well as the majority of the others. Furthermore, it necessarily requires such excessive proportions of liquid solvents to dissolve nitrocellulose that the suggested proportions of lactate salts would always exceed my proportions, (and especially of such salts as have been suggested to be used,) besides which the statement that alcoholic solutions of soluble lactic salts are solvents of tetranitrocellulose carries no indication of their use as antacids in transparent compounds when used in proper proportions, which are necessarily small.

It will be found that ninety-five-per-cent. ethyl alcohol containing five per cent. of sodium lactate, or even saturated therewith, will not dissolve ordinary pyroxylin even at the end of two days' contact. Absolute ethyl alcohol, which dissolves some grades of pyroxylin, will have its solvent power destroyed by adding sodium lactate to it. The strong commercial wood-spirit, which is a powerful and rapid solvent, loses solvent power in direct proportion as the lactate salts are added. The more soluble the salt the greater is the weakening effect. Practically all the ordinary grades of manufacturing pyroxylin are insoluble in a saturated solution of sodium lactate in wood-spirit.

Wherever I mention "camphor" it is to be understood that I can employ any equivalent solid solvent which will give the compound the molding property or the property of plasticity under heat, as is well understood. Many such substances are known. I do not, therefore, claim the broad use of these new antacid substances with pyroxylin in all proportions; but I do include in my invention any use of my proportions of an inorganic salt of lactic acid in a solid transparent pyroxylin compound, whether the compound is made as I have described or by adding to an ordinary transparent camphor compound sufficient alcohol and one or more of these salts to give my proportions and results.

For the reasons above described I include in my invention the present group of inorganic salts of lactic acid as preserving agents for transparent pyroxylin compounds, whether the salts are simple, compound, mixed, or combined chemically with other salts or compounds; but I exclude any combination of the salts of this specification with phosphoric acid, for such compounds have already been secured by me in United States Patent No. 610,615, of September 13, 1898, which patent includes such substances as lactophosphate of potassium, &c.

Having thus fully described my invention, what I claim, and desire to secure by Letters Patent, is—

1. A transparent composition of matter consisting of pyroxylin, camphor, a liquid solvent, and an inorganic salt of lactic acid, the said salt being present in a proportion not exceeding five per cent. to the pyroxylin.

2. A solid transparent composition of matter consisting of pyroxylin, camphor, and an inorganic salt of lactic acid, the salt being present in proportion not exceeding five per cent. to the pyroxylin, substantially as set forth.

3. A solid transparent composition of matter containing pyroxylin, camphor, and a member of the group of salts of lactic acid which are practically insoluble in alcohol consisting of lactate of calcium, lactate of strontium, and lactate of barium, substantially as described.

JOHN H. STEVENS.

Witnesses:
CHARLES H. FRANKLIN,
ABRAHAM MANNERS.